May 6, 1969

G. E. DEFENBAUGH 3,441,980

INJECTOR OF MEAT TENDERIZING AND FLAVORING
PREPARATIONS AND SUBSTANCES
Filed Feb. 16, 1967

INVENTOR.
George Earl Defenbaugh
BY
George Earl Defenbaugh

United States Patent Office 3,441,980
Patented May 6, 1969

3,441,980
INJECTOR OF MEAT TENDERIZING AND FLAVORING PREPARATIONS AND SUBSTANCES
George Earl Defenbaugh, 5802 S. New Haven, Tulsa, Okla. 74135
Filed Feb. 16, 1967, Ser. No. 616,547
Int. Cl. A22c 9/00
U.S. Cl. 17—30      2 Claims

ABSTRACT OF THE DISCLOSURE

The injector invented consists of the use of dull-crested extrusions having flat bottom valleys spiralling loosely clockwise and counter clockwise around pointed prongs which project from a handle. All extrusions' crests are equidistant from the center line of the prongs to which they are attached.

---

The invention relates in general to injectors and more particularly to injector of tenderizing and flavoring preparations and substances for meat.

For certain recipes and meat cooking methods it is desirable to break, mash, compress, cut and generally mangle the meat muscle fibres, membranes and tendons. This feature is generally obtained by use of available meat tenderers.

However, such tenderers are deficient in being able to utilize the potency of tenderizing and flavoring preparations and substances generally available in recent years. Properly used, said preparations and substances eliminate the need for compressing and mangling the texture and bulk of meat to make it tender. When the method of cooking is that of broiling, braising or roasting compressed and mangled meat generally is not desired.

It is well known that tenderizing and flavoring preparations and substances do not penetrate meat quickly without assistance and that long periods of marination are required to enable them to be absorbed so they can be effective in softening and flavoring the interior muscle fibres, membranes and tendons. Some manufacturers of tenderizing and flavoring preparations and substances suggest piercing the meat with a fork. The insertion of a fork prong exerts a lateral force only which displaces the muscle fibers, membranes and tendons. Said force does not loosen the common bond of the meat's texture so as to increase its absorbency. Also, the prongs of an ordinary fork, as with the prongs, blades and knives of all prior tenderer art, are smooth and will not carry, channel, push or force surface applied tenderizing and flavoring preparations and substances into the meat's interior where they must be placed to be most effective and to utilize their potency.

The membrane tissue which encase muscle fibres and commonly bond them to other such fibres, membranes and tissues can be made to loosen its bond by the application of different directional forces which will twist, contract and stretch said tissue. When said tissue is loose, the absorbency of the meat is increased and its texture is more amenable and responsive to tenderizing and flavoring preparations and substances; especially those which are placed, carried, channeled and forced into the meat's interior.

It is well known that meat fibres, membranes and tendons which have been compressed by the force of pounding, mashing, cutting and penetrating do not return readily of their own accord to their natural state of bulk; that the natural state of bulk of the meat is most desirable when the method of cooking is that of broiling, braising or roasting and that much of the meat's natural state of bulk can be restored to compressed meat by stretching its muscle fibres, membranes and tendons immediately after they have been compressed. Said stretching enables air, meat fluids released during compression, applied moisture and other substances to penetrate, be absorbed and fill void spaces which develop in the meat's texture. Thus, the expanded texture is given support and the meat's bulk is restored to a state and condition acceptable for cooking as aforesaid.

It is therefore the objects of my invention to provide an injector means for tenderizing and flavoring preparations and substances which produces the following results when used: first, when it is penetrating, said means will compress, twist and loosen the meat's muscle fibres, membranes and tendons; second, when it is penetrating, said means will channel, carry, force and inject surface applied tenderizing and flavoring preparations and substances to the meat's interior; third, when it is being withdrawn, said means will twist, loosen and separate the muscle fibres, membranes and tendons in directions opposite to those induced by penetration so as to create a dragging force which pulls on and stretches said fibres, membranes and tendons thereby causing vacuum spaces and voids to be formed in the meat's interior behind and below said means and at other places where said fibers, membranes and tendons have been made to loosen common bond and separate. Said dragging force cleans said means of the tenderizing and flavoring preparations and substances, increases the meat's absorbency and expands its bulk. Acting in concert with said dragging force, said vacuum spaces retain and hold the interior meat juice in place and draws in surface moisture and air which fill the vacuum spaces and other voids in the loose and expanded texture of the meat thereby giving support to the expanded bulk. Combined, the results produced by the use of the said means does not mangle and compress meat's texture. Instead, the meat's bulk is made loose, spongy, soft and juicy and to be permeated with air, meat juice, surface moisture, tenderizing and flavoring preparations and substances. It has the texture and appearance generally acceptable for cooking by broiling, braising and roasting methods.

Other objects and a fuller understanding of the invention may be had by referring to the following description and claims, taken in conjunction with the accompanying drawing in which:

Figure 1:
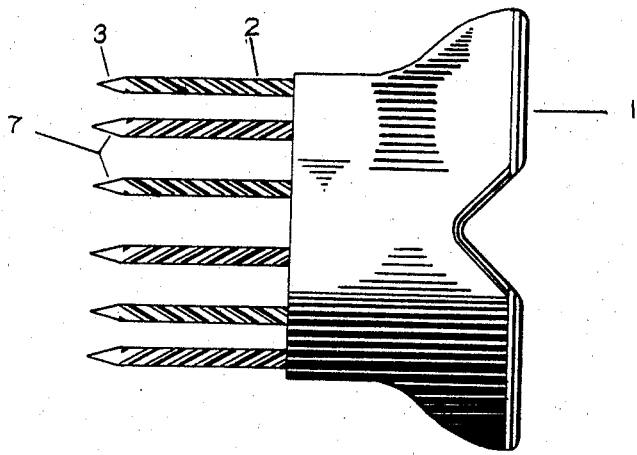
FIG. 1 shows a side view of prongs with spiraling extrusions attached to a handle.
Figure 2:
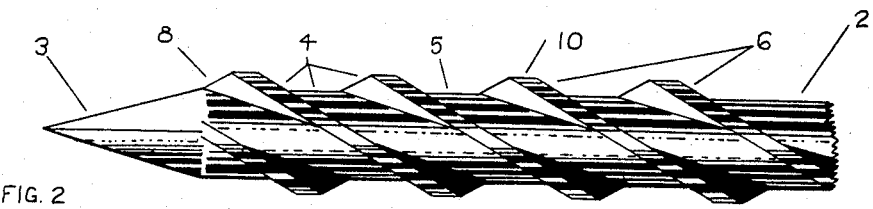
FIG. 2 shows a prong with extrusions which spiral around it in a clockwise direction proceeding from prong point toward handle.
Figure 3:
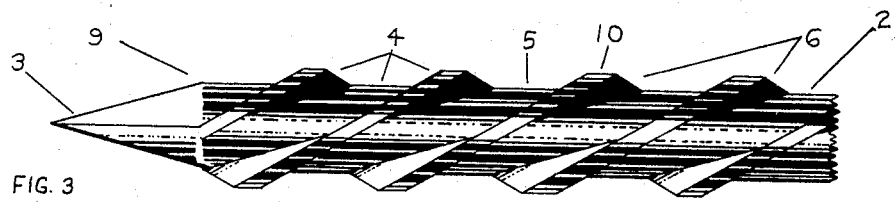
FIG. 3 shows a prong with extrusions which spiral around it in a counter-clockwise direction.

With reference to the drawings, the invention is illustrated in FIG. 2 and FIG. 3 as being extrusions 6 attached to prongs 3 which in spaced relationship 7, FIG. 1, are attached to one end of a cylindrical type handle indicated generally by the reference character 1, FIG. 1.

As illustrated the prongs 2 have long tapered to sharp points 3 and the extrusions 6 are spaced far enough from each other to provide a flat bottom 5 to the valley 4 between the extrusions. The extrusion spiral 6 loosely around the prong. The direction of the spiral is determined by proceeding from prong point 3 toward handle 1. The extrusions on a given prong spiral in the same direction. The extrusions may spiral in a clockwise 8 or a counter-clockwise 9 direction.

In assembling the injector, prongs which have extrusions spirally in the same direction may be used exclusively or, as illustrated in FIG. 1, prongs which have extrusions spiralling in a clockwise direction may be alternated with prongs which have extrusions spiralling in a counter-clockwise direction, or the two type of prongs may be combined or alternated in any number or arrangement.

The design of the prong to which the extrusions are attached is round and the distance from the center line of the prong to the crest 10 of its extrusions is the same at any point along the extrusions' crest.

The crest 10 of the extrusion is dull and will not cut, tear, sever or mangle the meat's fibres, membranes and tendons as the prongs are pushed into and withdrawn from the meat. As the prongs are forced to penetrate the meat, their extrusions force the muscle fibres, membranes and tendons to be compressed and twisted so as to loosen their common bond causing them to separate. Also, as the prongs penetrate, their extrusions carry, channel and force tenderizing and flavoring substances that have been applied earlier to the surface of the meat into its interior. As the prongs are withdrawn from the meat, their extrusions force the muscle fibres, membranes and tendons to twist back and toward their original position which further loosens and separates their common bond. Also, the extrusions cause the adjacent muscle fibres, membranes and tendons to cling to the extrusions creating a drag force which produces several necessary results: first, the drag force stretches the muscle fibres, membranes and tendons so as to expand and restore the meat's bulk from its compressed state caused by the penetrating forces. With its common bond loose, the meat's texture has more absorbency as its bulk is expanded; second, said drag force cause the adjacent muscle fibres, membranes and tendons to clean the extrusions and prongs of the tenderizing and flavoring substances and preparations; third, said drag force causes vacuum spaces and voids to develop in the interior of the meat as its compressed bulk is expanded. These vacuum spaces and voids hold in place, draw in and absorb the tenderizing and flavoring preparations and substances, meat juice liberated during compression and expansion, surface moisture and air. All of which add to and support the stretched and expanded texture and restores the meat's bulk.

The use, on prongs, of extrusions of the type illustrated and described herein provides an injector means for tenderizing and flavoring preparations and substances which neither mangles the texture of meat nor leaves its bulk compressed. The meat's texture and bulk is made loose, spongy, soft, and juicy and it is permeated with air, meat juice, surface moisture and surface applied tenderizing and flavoring preparation and substances. In such condition, the meat is capable of responding to and utilizing the potency of tenderizing and flavoring preparations and substances when such are used and its unmangled texture and appearance is such that the meat will be generally accepted for cooking by broiling, braising and roasting methods.

Although I have described my invention, its use and results with a certain degree of particularity, it is understood that the present disclosure has been made only by way of example and that numerous changes in the details of construction and the combination and arrangement of the parts may be resorted to.

What is claimed is:

1. An injector for meat tenderizing and flavoring preparations comprising a handle member, a plurality of pointed prongs projecting from said handle, each of said prongs having thereon a dull-crested spiral extrusion providing a flat bottom valley between the convolutions of said spiral extrusions, all points on the crest of said extrusions being of equidistance from the center line of the prong.

2. An injector as defined in claim 1 wherein the spiral on certain of said prongs extends in loose clockwise direction and on certain other of said prongs extends in loose counter-clockwise direction.

References Cited

UNITED STATES PATENTS

| 182,243 | 9/1876 | Stone | 17—30 |
| 644,248 | 2/1900 | Huntington | 17—1 |
| 802,444 | 10/1905 | Date | 17—25 |
| 1,357,069 | 10/1920 | Maechler | 17—30 |

LUCIE H. LAUDENSLAGER, *Primary Examiner.*

U.S. Cl. X.R.

99—254